US008954087B2

(12) United States Patent
Lee et al.

(10) Patent No.: US 8,954,087 B2
(45) Date of Patent: Feb. 10, 2015

(54) APPARATUS AND METHOD FOR PROVIDING COMMUNICATION SERVICES VIA TELEVISION WHITE SPACES

(75) Inventors: Won-Cheol Lee, Seoul (KR); Hyung-Min Chang, Seoul (KR); Joo-Pyoung Choi, Seoul (KR); Han-Nah Choi, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 54 days.

(21) Appl. No.: 13/591,402

(22) Filed: Aug. 22, 2012

(65) Prior Publication Data

US 2013/0122933 A1 May 16, 2013

(30) Foreign Application Priority Data

Nov. 16, 2011 (KR) ........................ 10-2011-0119394

(51) Int. Cl.
*H04W 72/00* (2009.01)
*H04W 16/14* (2009.01)
*H04W 48/14* (2009.01)
*H04W 64/00* (2009.01)

(52) U.S. Cl.
CPC .............. *H04W 16/14* (2013.01); *H04W 64/00* (2013.01); *H04W 48/14* (2013.01)
USPC ..................... 455/454; 455/562.1; 455/552.1; 455/452.1; 455/456.1

(58) Field of Classification Search
CPC .............................. H04W 64/00; H04W 16/14
USPC ............. 455/562.2, 562.1, 456.1, 454, 552.1, 455/452.1
See application file for complete search history.

(56) References Cited

U.S. PATENT DOCUMENTS

| | | | | |
|---|---|---|---|---|
| 2008/0159208 A1* | 7/2008 | Kloker et al. | ................. | 370/329 |
| 2010/0246506 A1* | 9/2010 | Krishnaswamy | ............. | 370/329 |
| 2010/0255794 A1* | 10/2010 | Agnew | ............................ | 455/77 |
| 2011/0122855 A1* | 5/2011 | Henry | ............................ | 370/338 |
| 2012/0207033 A1* | 8/2012 | Hakola et al. | ................. | 370/252 |
| 2013/0336241 A1* | 12/2013 | Keon | ............................ | 370/329 |

OTHER PUBLICATIONS

Sang Yoon Lee, "Frequency Sharing Technology and TV White Space Policy Trend", KISDI Broadcasting Telecommunication Policy, Aug. 2, 2010, pp. 24-44, vol. 22 No. 14, Republic of Korea.

* cited by examiner

*Primary Examiner* — Barry Taylor
(74) *Attorney, Agent, or Firm* — William Park & Associates Patent Ltd.

(57) ABSTRACT

Disclosed herein are an apparatus and method for providing communication services. The apparatus includes a location information acquisition unit, a radio station information acquisition unit, and an offloading unit. The location information acquisition unit acquires information about the current location of the user terminal by sending a location information request message to the user terminal. The radio station information acquisition unit requests information about a white space radio station from which the user terminal can receive the communication services by sending the information about the current location of the user terminal to a white space server, and acquires, from the white space server, information about an available white space radio station. The offloading unit sends the information about the available white space radio station to the user terminal, and also sends information about the user terminal to the available white space radio station.

14 Claims, 3 Drawing Sheets

APPARATUS AND METHOD FOR PROVIDING COMMUNICATION SERVICES VIA TELEVISION WHITE SPACES

CROSS-REFERENCE TO RELATED APPLICATION

This application claims priority to and the benefit of Korean Patent Application No. 2011-0119394, filed on Nov. 16, 2011, the disclosure of which is incorporated herein by reference in its entirety.

BACKGROUND OF THE INVENTION

1. Field of the Invention

The present invention relates generally to an apparatus and method for providing communication services via television (TV) white spaces and, more particularly, to an apparatus and method that provide communication services, which are provided to user terminals over a mobile communication network, to user terminals via TV white spaces.

2. Description of the Related Art

With an increase in the amount of data that is being used by mobile communication devices including smart phones, there is an increasing demand for the distribution of data via a communication network other than a mobile communication network related to a mobile base station. Recently, mobile communication devices have supported offloading from a conventional mobile communication network service to a Wireless Local Area Network (WLAN) service chiefly using the 2.4 GHz band. However, the 2.4 GHz band is problematic in that the probability of interference is high because it is the Industrial, Scientific and Medical (ISM) band and thus the frequency of use by multiple wireless communication devices is high, and in that a rapid reduction in performance occurs at any distance farther away than 10 m, which is the effective distance of the 2.4 GHz WLAN communication service.

In this case, a network using TV white spaces may be contemplated as an example of another available communication network. In connection with this, attempts were made to use a network using TV white spaces as means alternative to an existing communication network. Recently, the U.S. Federal Communications Commission (FCC) approved "Super Wi-Fi" that enables TV white spaces, which were the unused and underused frequency bands of the digital TV broadcasting service spectrum, to be used for the wireless Internet, so that a basis was established for utilizing a wide area as a single Wi-Fi hotspot. However, a scheme for using a network using TV white spaces as a network complementary to a broadband mobile communication network has not been proposed yet.

SUMMARY OF THE INVENTION

Accordingly, the present invention has been made keeping in mind the above problems occurring in the prior art, and an object of the present invention is to provide an apparatus and method for providing communication services via TV white spaces, which enable white space radio stations using TV white spaces to provide services that are provided by mobile base stations over a mobile communication network.

Another object of the present invention is to provide a computer-readable storage medium that stores a program that can execute, on a computer, the method for providing communication services via TV white spaces, which enables white space radio stations using TV white spaces to provide services that are provided by mobile base stations over a mobile communication network.

In order to accomplish the above objects, the present invention provides an apparatus for providing communication services, the apparatus being implemented in a mobile base station, and the apparatus providing the communication services to at least one user terminal over a mobile communication network and enabling the user terminal to receive the communication services via TV white spaces, wherein the apparatus includes a location information acquisition unit configured to acquire information about a current location of the user terminal by sending a location information request message to the user terminal; a radio station information acquisition unit configured to request information about a white space radio station from which the user terminal can receive the communication services by sending the information about the current location of the user terminal to a white space server that manages status of use of the TV white spaces of a plurality of white space radio stations, and configured to acquire, from the white space server, information about an available white space radio station which is determined from among the plurality of white space radio stations based on the information about the current location of the user terminal and the status of use of the TV white spaces; and an offloading unit configured to send the information about the available white space radio station to the user terminal, and to also send information about the user terminal to the available white space radio station.

In order to accomplish the above objects, the present invention provides an apparatus for providing communication services, the apparatus being implemented in a white space server, and the apparatus providing the communication services to at least one user terminal, receiving the communication services over a mobile communication network, via TV white spaces, wherein the apparatus include a database unit configured to receive status of use of the TV white spaces of a plurality of white space radio stations from the plurality of white space radio stations, and to store the status; an information provision unit configured to receive information about a white space radio station from which the user terminal can receive the communication services, together with information about a current location of the user terminal, from a mobile base station that provides the communication services over the mobile communication network, and configured to send information about an available white space radio station to the mobile base station; and an information search unit configured to determine the available white space radio station from among the plurality of white space radio stations based on the information about the current location of the user terminal received from the mobile base station and the status of use of the TV white spaces stored in the database unit.

In order to accomplish the above objects, the present invention provides a method of providing communication services, the method being performed by a mobile base station, and the method providing the communication services to at least one user terminal over a mobile communication network and enabling the user terminal to receive the communication services via TV white spaces, wherein the method includes acquiring information about a current location of the user terminal by sending a location information request message to the user terminal; requesting information about a white space radio station from which the user terminal can receive the communication services by sending the information about the current location of the user terminal to a white space server that manages status of use of the TV white spaces of a plurality of white space radio stations, and acquiring, from the white space server, information about an available white space radio station which is determined from among the plurality of white space radio stations based on the information about the current location of the user terminal and the status of use of the TV white spaces; and sending the information about the available white space radio station to the user terminal and also sending information about the user terminal to the available white space radio station.

In order to accomplish the above objects, the present invention provides a method for providing communication services, the method being performed by a white space server, and the method providing the communication services to at least one user terminal, receiving the communication services over a mobile communication network, via TV white spaces, wherein the method includes receiving status of use of the TV white spaces of a plurality of white space radio stations from the plurality of white space radio stations, and storing the status; receiving information about a white space radio station from which the user terminal can receive the communication services, together with information about a current location of the user terminal, from a mobile base station that provides the communication services over the mobile communication network, and sending information about an available white space radio station to the mobile base station; and determining the available white space radio station from among the plurality of white space radio stations based on the information about the current location of the user terminal received from the mobile base station and the status of use of the TV white spaces stored in the database unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
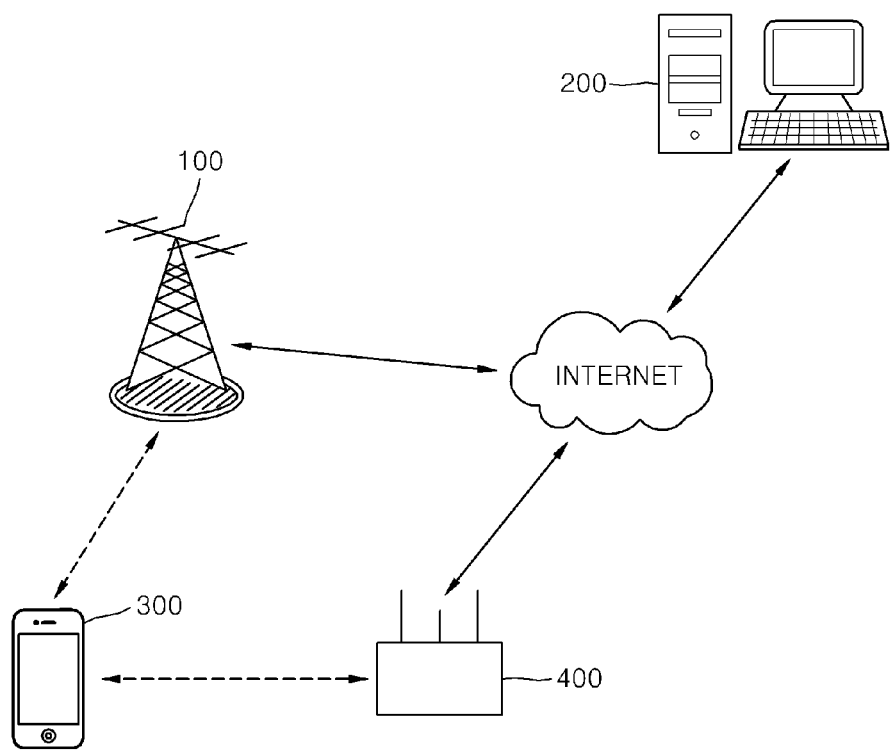
FIG. 1 is a block diagram showing the configuration of an overall system including an apparatus for providing communication services via TV white spaces according to the present invention.

Reference now should be made to the drawings, throughout which the same reference numerals are used to designate the same or similar components.

An apparatus and method for providing communication services via TV white spaces according to embodiments of the present invention will be described in detail below with reference to the accompanying drawings.

FIG. 1 is a block diagram showing the configuration of an overall system including an apparatus for providing communication services via TV white spaces according to the present invention.

Referring to FIG. 1, a mobile base station 100 is connected to a user terminal 300 over a mobile communication network and provides communication services, and is connected to a white space server 200 and a white space radio station 400 over the Internet or some other wired/wireless communication network. Furthermore, the white space server 200 and the white space radio station 400 are provided in connection with TV white spaces, and are configured to provide communication services, which are provided to the user terminal 300 by the mobile base station 100 over the mobile communication network, via TV white spaces.

The user terminal 300 uses a variety of types of communication services, such as a data communication service, which are provided by the mobile base station 100, over the mobile communication network. In this case, the mobile base station 100 may cause the user terminal 300 to be connected to the white space radio station 400 so that the white space radio station 400 using TV white spaces will provide the communication services that have been provided by the mobile base station 100 to the user terminal 300 in the same manner. This is referred to as offloading. The information required to perform offloading or more specifically the information about the white space radio station 400 to which the user terminal 300 will be connected is provided by the white space server 200.

The functions that are performed by the mobile base station 100 and the white space server 200 so that the user terminal 300 can be offloaded to the white space radio station 400 while receiving communication services from the mobile base station 100 will be described in detail below. In the following description, among apparatuses for providing communication services according to a variety of embodiments of the present invention, the apparatus for providing communication services, which is implemented in the mobile base station 100, is defined as the mobile base station 100, while the apparatus for providing communication services, which is implemented in the white space server 200, is defined as the white space server 200.

Figure 2:
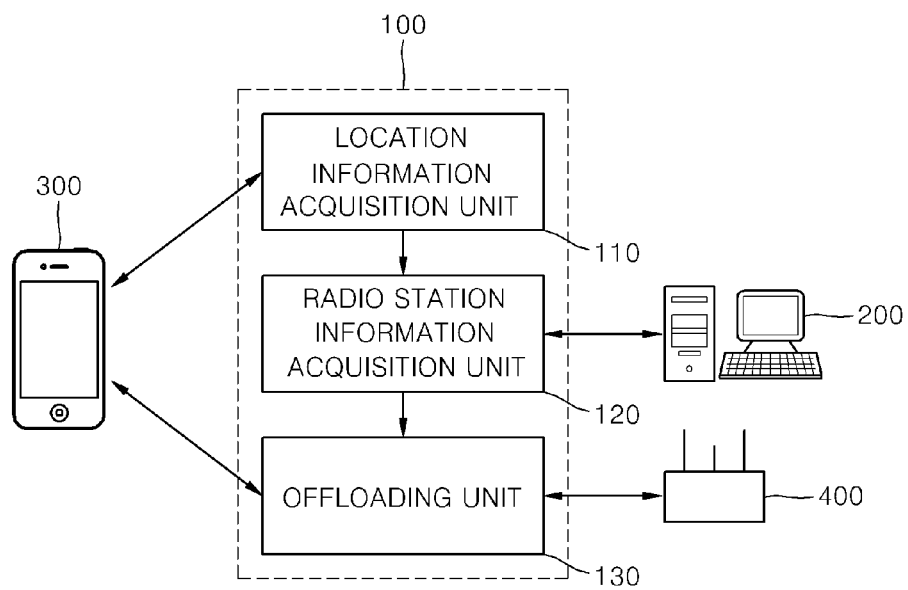
FIG. 2 is a block diagram showing the configuration of a mobile base station according to an embodiment of the present invention.

FIG. 2 is a block diagram showing the configuration of the mobile base station 100 according to an embodiment of the present invention. Referring to FIG. 2, the mobile base station 100 includes a location information acquisition unit 110, a radio station information acquisition unit 120, and an offloading unit 130.

As described above, the mobile base station 100 provides communication services to the user terminal 300 over a mobile communication network, and performs offloading so that the user terminal 300 can receive the communication services from one of a plurality of white space radio stations 400 via TV white spaces.

The location information acquisition unit 110 sends a location information request message to the user terminal 300, and then acquires information about the current location of the user terminal 300. The current location of the user terminal 300 is required to determine one of the plurality of white space radio stations 400 to which the user terminal 300 will be offloaded.

The radio station information acquisition unit 120 sends the information about the current location of the user terminal 300 to the white space server 200 that manages the status of use of the TV white spaces of the plurality of white space radio stations 400, thereby requesting information about a white space radio station 400 from which the user terminal 300 can receive communication services. The white space server 200 provides information about one of the plurality of white space radio stations 400 to which the user terminal 300 will be connected (hereinafter referred to as the "available white space radio station 400").

Figure 3:
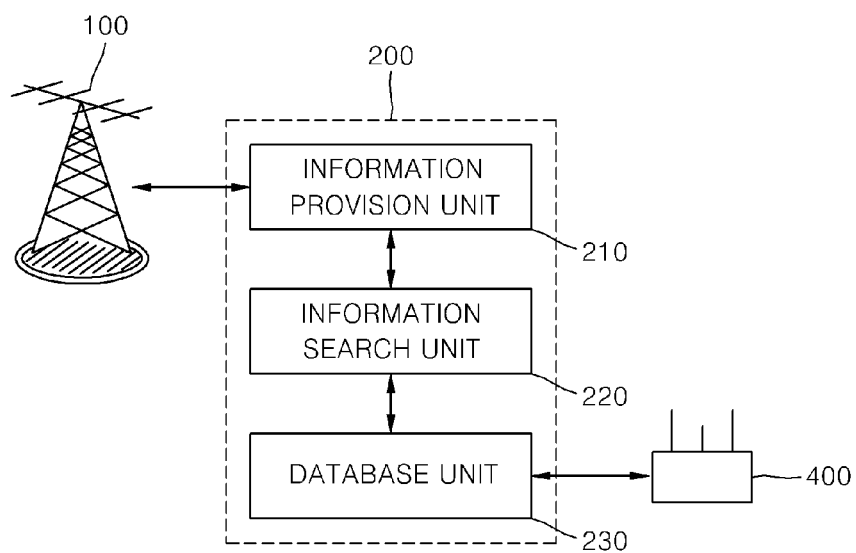
FIG. 3 is a block diagram showing the configuration of a white space server according to an embodiment of the present invention.

FIG. 3 is a block diagram showing the configuration of the white space server 200 according to an embodiment of the present invention. Referring to FIG. 3, the white space server 200 includes an information provision unit 210, an information search unit 220, and a database unit 230.

The information provision unit 210 receives a request for information about a white space radio station 400 from which the user terminal 300 can receive communication services, together with information about the current location of the user terminal 300, from the mobile base station 100, and then sends information about an available white space radio station 400 to the mobile base station 100. In this case, the information search unit 220 uses the information about the current location of the user terminal 300 received from mobile base station 100 and the information stored in the database unit 230 in order to determine the available white space radio station 400.

The database unit 230 stores the status of use of the TV white spaces of the plurality of white space radio stations 400 as well as information about TV broadcasting services, auxiliary broadcasting services, licensed wireless microphones and CATV head ends that are located in an area in which the user terminal 300 is located and that should be protected. The database unit 230 may receive the status of use of TV white spaces directly from the plurality of white space radio stations 400, and the white space radio stations 400 send the status of use of the TV white spaces thereof to the database unit 230 periodically or whenever a specific event, such as a variation, occurs.

The information search unit 220 determines the available white space radio station 400 based on the information about the current location of the user terminal 300 and the status of use of TV white spaces stored in the database unit 230, but avoids the interference not only with Digital Television (DTV) receivers for receiving a digital TV service as primary licensed users but also with auxiliary broadcasting services, licensed wireless microphones and Cable Television (CATV) head ends. That is, when the available white space radio station 400 from which the user terminal 300 can receive communication services is determined, the current location of the user terminal 300, the status of use of the TV white spaces of the white space radio stations 400 and the interference with primary licensed users are all taken into consideration.

The information provision unit 210 sends information about the available white space radio station 400 determined by the information search unit 220, to the mobile base station 100.

Referring back to FIG. 2, the radio station information acquisition unit 120 of the mobile base station 100 acquires the information about the available white space radio station 400 from the information provision unit 210 of the white space server 200, and the offloading unit 130 thereof sends the information about the available white space radio station 400, received from the information provision unit 210 of the white space server 200, to the user terminal 300, and also sends information about the user terminal 300 to the available white space radio station 400. Here, the information about the available white space radio station 400 includes the Internet Protocol (IP) address of the available white space radio station 400, and the information about the user terminal 300 includes the unique identification (ID) information of the user terminal 300.

The user terminal 300 and available white space radio station 400 that have received the information from the mobile base station 100 enter the state of being able to connect to and communicate with each other via a TV white spaces later. More specifically, the available white space radio station 400 sends a communication initiation request message to the user terminal 300 based on the information about the user terminal 300 that has been received from the mobile base station 100. The communication initiation request message may include information whether to initiate communication between the user terminal 300 and the white space radio station 400 and information about a protocol that will be used in the communication.

The communication initiation request message that is sent by the available white space radio station 400 may be sent directly to the user terminal 300, or may be first received by the offloading unit 130 of the mobile base station 100 from the available white space radio station 400 and then sent to the user terminal 300. Furthermore, the available white space radio station 400 may receive information about a plurality of user terminals 300 from the offloading unit 130, and send a communication initiation request message to all of the plurality of user terminals 300.

The user terminal 300 or one or more of the plurality of user terminals 300 which have received the communication initiation request message and which can use communication services via TV white spaces send communication initiation acceptance messages to the available white space radio station 400. In this case, the communication initiation acceptance messages may be sent directly to the available white space radio station 400, or may be transferred via the offloading unit 130 of the mobile base station 100.

The user terminals 300 that have sent the communication initiation acceptance messages perform the process of connecting to the available white space radio station 400 via TV white spaces. For example, the user terminals 300 may perform the process of switching between a protocol for communication over a mobile communication network and a protocol for communication via TV white spaces. The available white space radio station 400 that has received the communication initiation acceptance messages from the user terminals 300 also performs a required process, such as the process of setting up a channel that is used to provide communication services to the user terminals 300. Thereafter, the user terminals 300 may connect to the white space radio station 400, rather than the mobile base station 100, and receive communication services that are the same as those provided by the mobile base station 100.

Figure 4:
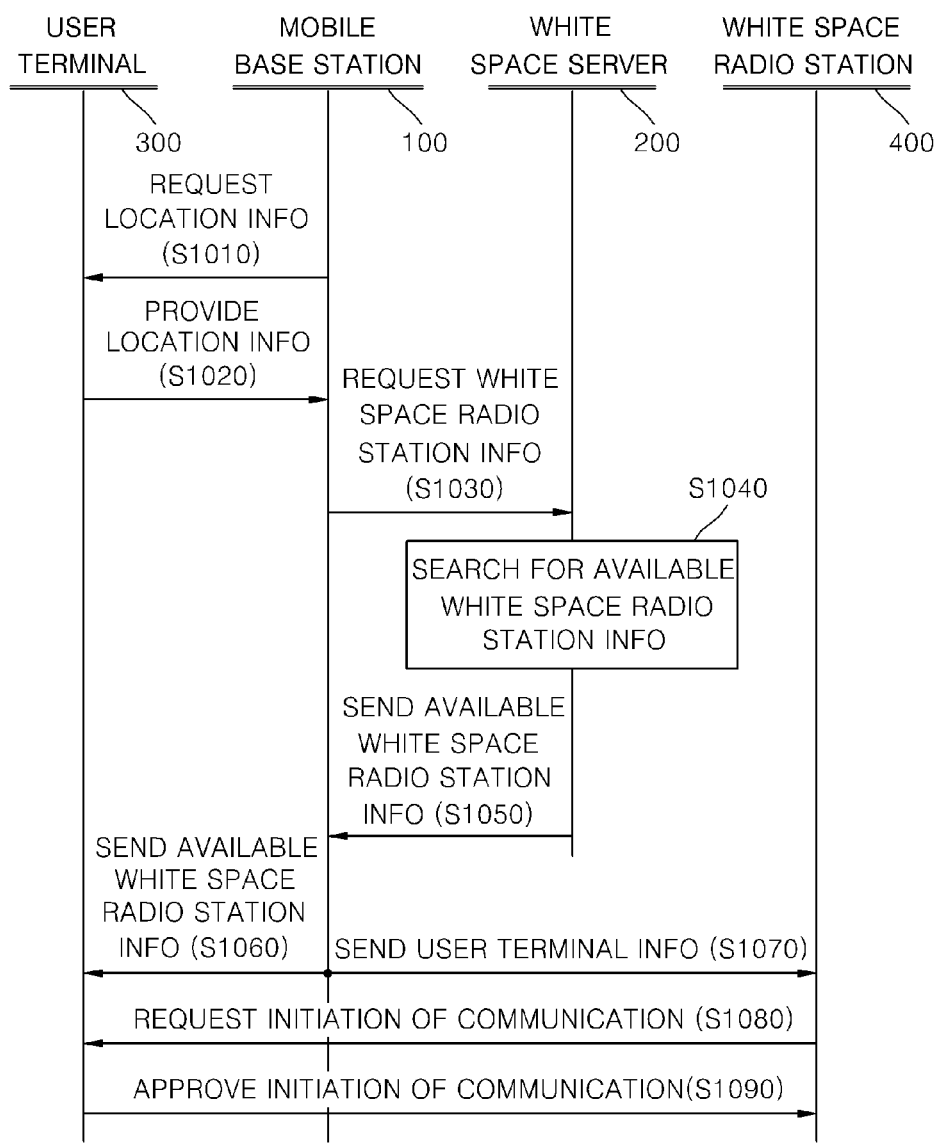
FIG. 4 is a flowchart showing a method of providing communication services via TV white spaces according to an embodiment of the present invention.

FIG. 4 is a flowchart showing a method of providing communication services via TV white spaces according to an embodiment of the present invention.

As shown in FIG. 4, the method of providing communication services via TV white spaces according to this embodiment of the present invention may be preferably performed by the above-described mobile base station 100 and white space server 200. FIG. 4 is a diagram showing the embodiment in which the method of providing communication services via TV white spaces is performed by the user terminal 300 and the white space radio station 400 as well as the mobile base station 100 and the white space server 200.

Referring to FIG. 4, the mobile base station 100 requests information about the current location of the user terminal 300 from the user terminal 300 at step S1010, and the user terminal 300 provides information about the current location thereof to the mobile base station 100 at step S1020. In this case, the mobile base station 100 may request information about the current locations of a plurality of user terminals 300 from the plurality of user terminals 300.

Thereafter, the mobile base station 100 requests information about an available white space radio station 400 from the white space server 200 by sending the information about the current location of the user terminal 300 to the white space server 200 at step S1030, and the white space server 200 searches for the information about the available white space radio station 400 using the above-described method at step S1040.

Thereafter, the white space server 200 sends the information about the available white space radio station 400 to the mobile base station 100 at step S1050, and the mobile base station 100 sends the information about the available white space radio station 400 to the user terminal 300 and also sends information about the user terminal 300 to the available white space radio station 400 at steps S1060 and S1070.

The available white space radio station 400 that has received the information sends a communication initiation request message to the user terminal 300 at step S1080. In this case, the communication initiation request message may be directly sent, or may be transferred via the mobile base station 100. The user terminal 300 sends a communication initiation acceptance message to the available white space radio station 400 at step S1090, and thereafter the user terminal 300 may receive, from the available white space radio station 400, communication services that are the same as those provided by the mobile base station 100.

The present invention may be implemented in the form of computer-readable code that is stored in a computer-readable storage medium. The computer-readable storage medium includes all types of storage devices in which computer system-readable data can be stored. Examples of the computer-readable storage medium are Read Only Memory (ROM), Random Access Memory (RAM), Compact Disk-Read Only Memory (CD-ROM), magnetic tape, a floppy disk, and an optical data storage device. Furthermore, the computer-readable storage medium may be implemented in the form of carrier waves (for example, in the case of transmission over the Internet). Moreover, the computer-readable medium may be distributed across computer systems connected via a network, and be configured such that computer-readable code can be stored and executed in a distributed manner.

The apparatus and method for providing communication services via TV white spaces according to the present invention provide communication services, which are provided by mobile base stations, via TV white spaces without interfering not only with DTV receivers but also with auxiliary broadcasting services, licensed wireless microphones and CATV head ends, so that they can distribute data from a broadband mobile communication network to another communication network, thereby providing reliable communication services and also preventing the congestion of wireless communication in the existing wireless communication frequency band. Furthermore, the apparatus and method for providing communication services via TV white spaces use TV white spaces to provide communication services, thereby efficiently using insufficient frequency resources.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. An apparatus for providing communication services, the apparatus being implemented in a mobile base station, and the apparatus providing the communication services to at least one user terminal over a mobile communication network and enabling the user terminal to receive the communication services via TV white spaces, wherein the apparatus comprises:

a location information acquisition unit configured to acquire information about a current location of the user terminal by sending a location information request message to the user terminal;

a radio station information acquisition unit configured to request information about a white space radio station from which the user terminal can receive the communication services by sending the information about the current location of the user terminal to a white space server that manages status of use of the TV white spaces of a plurality of white space radio stations, and configured to acquire, from the white space server, information about an available white space radio station which is determined from among the plurality of white space radio stations based on the information about the current location of the user terminal and the status of use of the TV white spaces; and an offloading unit configured to send the information about the available white space radio station to the user terminal, and to also send information about the user terminal to the available white space radio station, wherein the available white space radio station is determined so as to avoid interference with one or more Digital Television (DTV) receivers receiving a digital broadcasting service as primary licensed users, one or more auxiliary broadcasting services, one or more licensed wireless microphones, and one or more Cable Television (CATV) head ends.

2. The apparatus of claim 1, wherein the offloading unit causes communication between the user terminal and the available white space radio station to be initiated by sending a communication initiation request message, received from the available white space radio station that received the information about the user terminal, to the user terminal.

3. The apparatus of claim 1, wherein the information about the available white space radio station includes an Internet Protocol (IP) address of the available white space radio station, and the information about the user terminal includes unique identification information of the user terminal.

4. The apparatus of claim 1, wherein the apparatus is connected to the white space server and the white space radio station over an Internet.

5. An apparatus for providing communication services, the apparatus being implemented in a white space server, and the apparatus providing the communication services to at least one user terminal, receiving the communication services over a mobile communication network, via TV white spaces, wherein the apparatus comprises:

a database unit configured to receive status of use of the TV white spaces of a plurality of white space radio stations from the plurality of white space radio stations, and to store the status;

an information provision unit configured to receive information about a white space radio station from which the user terminal can receive the communication services, together with information about a current location of the user terminal, from a mobile base station that provides the communication services over the mobile communication network, and configured to send information about an available white space radio station to the mobile base station; and an information search unit configured to determine the available white space radio station from among the plurality of white space radio stations based on the information about the current location of the user terminal received from the mobile base station and the status of use of the TV white spaces stored in the database unit, wherein the database unit stores information about one or more Television (TV) broadcasting services, one or more auxiliary broadcasting services, one or more licensed wireless microphones and one or more CATV head ends that have been set as protection targets in a preset area in which the user terminal is located, and wherein the information search unit determines the available white space radio station so as to avoid interference with one or more DTV receivers for receiving a digital broadcasting service as primary licensed users, one or more auxiliary broadcasting services, one or more licensed wireless microphones, and one or more CATV head ends.

6. The apparatus of claim 5, wherein the information about the available white space radio station includes an IP address of the available white space radio station.

7. The apparatus of claim 5, wherein the database unit periodically receives the status of use of the TV white spaces from the plurality of white space radio stations, and stores the status.

8. A method of providing communication services, the method being performed by a mobile base station, and the method providing the communication services to at least one user terminal over a mobile communication network and enabling the user terminal to receive the communication services via TV white spaces, wherein the method comprises:

acquiring information about a current location of the user terminal by sending a location information request message to the user terminal;

requesting information about a white space radio station from which the user terminal can receive the communication services by sending the information about the current location of the user terminal to a white space server that manages status of use of the TV white spaces of a plurality of white space radio stations, and acquiring, from the white space server, information about an available white space radio station which is determined from among the plurality of white space radio stations based on the information about the current location of the user terminal and the status of use of the TV white spaces; and sending the information about the available white space radio station to the user terminal and also sending information about the user terminal to the available white space radio station, wherein the available white space radio station is determined so as to avoid interference with one or more DTV receivers for receiving a digital broadcasting service as primary licensed users, one or more auxiliary broadcasting services, one or more licensed wireless microphones, and one or more CATV head ends.

9. The method of claim 8, further comprising causing communication between the user terminal and the available white space radio station to be initiated by sending a communication initiation request message, received from the available white space radio station that received the information about the user terminal, to the user terminal.

10. The method of claim 8, wherein the information about the available white space radio station includes an Internet Protocol (IP) address of the available white space radio station, and the information about the user terminal includes unique identification information of the user terminal.

11. The method of claim 8, wherein the mobile base station is connected to the white space server and the white space radio station over an Internet.

12. A method for providing communication services, the method being performed by a white space server, and the method providing the communication services to at least one user terminal, receiving the communication services over a mobile communication network, via TV white spaces, wherein the method comprises:

receiving status of use of the TV white spaces of a plurality of white space radio stations from the plurality of white space radio, stations, and storing the status;

receiving information about a white space radio station from which the user terminal can receive the communication services, together with information about a current location of the user terminal, from a mobile base station that provides, the communication services over the mobile communication network, and sending information about an available white space radio station to the mobile base station; and determining the available white space radio station from among the plurality of white space radio stations based on the information about the current location of the user terminal received from the mobile base station and the status of use of the TV white spaces stored in the database unit, wherein the receiving status of use of the TV white spaces of a plurality of white space radio stations and the storing the status comprises storing, in a database unit, information about one or more TV broadcasting services, one or more auxiliary broadcasting services, one or more licensed wireless microphones and one or more CATV head ends that have been set as protection targets in a preset area in which the user terminal is located, and wherein the determining the available white space radio station comprises determining the available white space radio station so as to avoid interference with one or more DTV receivers for receiving a digital broadcasting service as primary licensed users, one or more auxiliary broadcasting services, one or more licensed wireless microphones, and one or more CATV head ends.

13. The method of claim 12, wherein the information about the available white space radio station includes an IP address of the available white space radio station.

14. The method of claim 12, wherein the status of use of the TV white spaces is periodically received from the plurality of white space radio stations by the database unit, and is then stored in the database unit.

* * * * *